(12) United States Patent
Miyazaki et al.

(10) Patent No.: US 8,289,071 B2
(45) Date of Patent: Oct. 16, 2012

(54) CHARGE PUMP

(75) Inventors: Masato Miyazaki, Hamamatsu (JP);
Hirotaka Kawai, Hamamatsu (JP);
Tatsuya Kishii, Iwata (JP); Masayoshi Nakamura, Nagaokakyo (JP); Ken Makino, Toyama (JP)

(73) Assignee: Yamaha Corporation, Hamamatsu-shi (JP)

( * ) Notice: Subject to any disclaimer, the term of this patent is extended or adjusted under 35 U.S.C. 154(b) by 211 days.

(21) Appl. No.: 12/807,849

(22) Filed: Sep. 15, 2010

(65) Prior Publication Data
US 2011/0068856 A1 Mar. 24, 2011

(30) Foreign Application Priority Data
Sep. 18, 2009 (JP) .................... 2009-216696

(51) Int. Cl.
*G05F 1/10* (2006.01)
*G05F 3/02* (2006.01)
(52) U.S. Cl. ........................................ 327/536
(58) Field of Classification Search .............. 327/536; 363/59–60
See application file for complete search history.

(56) References Cited

U.S. PATENT DOCUMENTS

| | | | |
|---|---|---|---|
| 5,461,557 A | 10/1995 | Tamagawa | |
| 6,906,577 B2 * | 6/2005 | Kim | ................ 327/536 |
| 7,208,995 B2 | 4/2007 | Hashimoto | |
| 2005/0104651 A1 | 5/2005 | Hashimoto | |
| 2009/0039947 A1 * | 2/2009 | Williams | ................ 327/536 |
| 2011/0204961 A1 * | 8/2011 | Galal et al. | ................ 327/536 |

FOREIGN PATENT DOCUMENTS

| | | |
|---|---|---|
| JP | 6165482 A | 6/1994 |
| KR | 10-2005-0048521 A | 5/2005 |

OTHER PUBLICATIONS

Korean Intellectual Property Office, "Notice of Allowance" Korean Patent Application No. 10-2010-0091636 of Yamaha Corporation; Date: Oct. 31, 2011; 2 pages.

* cited by examiner

*Primary Examiner* — Quan Tra
(74) *Attorney, Agent, or Firm* — Pillsbury Winthrop Shaw Pittman LLP (57) ABSTRACT

A charge pump includes a switching circuit which is interposed among first and second output capacitors, a flying capacitor, and an input power supply; and a control unit which controls the switching circuit. The charge pump is operated in an operation mode including a high-voltage outputting mode, a low-voltage outputting mode, and a relay mode. The control unit controls the switching circuit so that respective charging voltages of the first and second capacitors that are charged in the high-voltage outputting mode are gradually lowered. The control unit changes the operation mode of the charge pump by relay transition from the high-voltage outputting mode through the relay mode to the low-voltage outputting mode when a voltage lower command is given during a period when the operation mode of the charge pump is in the high-voltage outputting mode.

7 Claims, 6 Drawing Sheets

CHARGE PUMP

BACKGROUND OF THE INVENTION

1. Technical Field

The present invention relates to a charge pump which generates power supply voltages respectively having positive and negative polarities, by using a single input power supply.

2. Background Art

A charge pump is a DC/DC converter in which charges are moved among a plurality of capacitors to produce a voltage having a desired polarity and level. For example, JP-A-6-165482 discloses a charge pump of this kind.

Depending on the purpose of a charge pump, the charge pump is sometimes requested to have functions of selectively generating two kinds of high and low voltages, and while generating the output voltages, switching the output voltage from the low voltage to the high voltage in accordance with a voltage raise command, and switching the output voltage from the high voltage to the low voltage in accordance with a voltage lower command. In order to generate the former or the high voltage, it is requested to repeatedly perform operations of applying the output voltage of an input power supply to one capacitor, and redistributing charged charges of the capacitor to an output capacitor connected to a power supply terminal of a load. In order to generate the latter or the low voltage, it is requested to repeatedly perform operations of applying the output voltage of the input power supply to two capacitors which are connected in series, and redistributing charged charges of one of the two capacitors which are connected in series, to the output capacitor connected to the power supply terminal of the load. In the case where the charge pump is transitioned from the operation state of outputting the high voltage to that of outputting the low voltage, however, a problem is caused. When the operation state of outputting the high voltage is ended, a voltage which is equal to the output voltage of the input power supply remains in the capacitor. When the operation of outputting the low voltage is started, therefore, the series connection of the capacitor in which the charging voltage remains, and the other one capacitor is connected to the input power supply, thereby producing a case where an excess voltage is generated in a voltage outputting portion of the input power supply to cause the charge pump to abnormally operate.

SUMMARY OF THE INVENTION

The invention has been conducted in view of the above-described circumstance. It is an object of the invention to provide a charge pump which can selectively generate two kinds of high and low voltages, and in which the operation state of outputting the high voltage can smoothly transition to that of outputting the low voltage.

The present invention provides a charge pump comprising: a switching circuit which is interposed among first and second output capacitors, a flying capacitor, and an input power supply; and a control unit which controls the switching circuit, wherein the charge pump is operated in an operation mode including a high-voltage outputting mode, a low-voltage outputting mode, and a relay mode, and the control unit controls the switching circuit so that: in the high-voltage outputting mode, the first and second output capacitors respectively outputs first positive and negative voltages; in the low-voltage outputting mode, the first and second output capacitors respectively outputs second positive and negative voltages lower than the first positive and negative voltages; and in the relay mode, respective charging voltages of the first and second capacitors that are charged in the high-voltage outputting mode are gradually lowered, and the control unit changes the operation mode of the charge pump by direct transition from the low-voltage outputting mode to the high-voltage outputting mode when a voltage raise command is given during a period when the operation mode of the charge pump is in the low-voltage outputting mode, and the control unit changes the operation mode of the charge pump by relay transition from the high-voltage outputting mode through the relay mode to the low-voltage outputting mode when a voltage lower command is given during a period when the operation mode of the charge pump is in the high-voltage outputting mode.

According to the invention, the transition from the high-voltage outputting mode to the low-voltage outputting mode is passed through the relay mode. When the operation in the relay mode is performed, the charging voltages of the first and second output capacitors and the flying capacitor can be lowered, so that the transition to the low-voltage outputting mode can be smoothly performed.

DETAILED DESCRIPTION OF THE EXEMPLARY EMBODIMENTS

An embodiment of the invention will be described with reference to the drawings.

Figure 1:
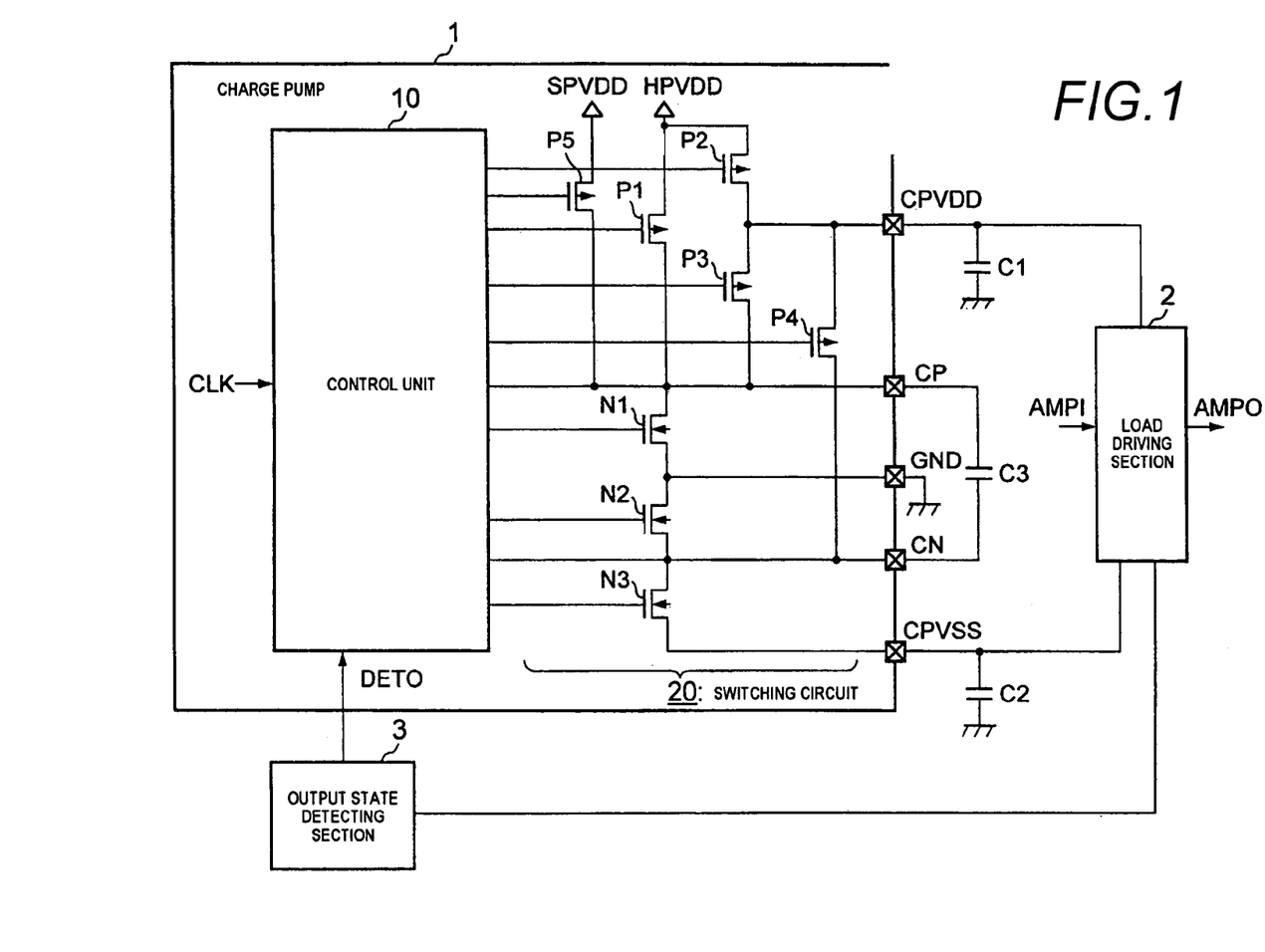
FIG. 1 is a circuit diagram showing the configuration of a power amplifying circuit including a charge pump according to an embodiment of the invention.

FIG. 1 is a circuit diagram showing the configuration of a power amplifying circuit including a charge pump 1 according to an embodiment of the invention. The power amplifying circuit includes the charge pump 1 functioning as a power supply circuit, a load driving section 2, and an output state detecting section 3. The charge pump 1 is a power supply circuit which generates positive and negative power supply voltages to be supplied to the load driving section 2. The load driving section 2 is an amplifier which receives the positive and negative power supply voltages from the charge pump 1, which amplifies an input signal AMPI that is supplied from a preceding stage circuit (not shown), and which supplies the amplified signal as an output signal AMPO to a load (not shown). The output state detecting section 3 monitors the output state of the load driving section 2, and outputs an output state detection signal DETO indicating whether or not the output signal AMPO of the load driving section 2 exceeds a predetermined limit to approach the power supply voltage supplied to the load driving section 2.

As illustrated in FIG. 1, the charge pump 1 has a control unit 10, a switching circuit 20, and terminals CPVDD, CP, GND, CN, and CPVSS. The terminal CPVDD is connected to a positive power supply terminal of the load driving section 2, and the terminal CPVSS is connected to a negative power supply terminal of the load driving section 2. The terminal GND is grounded, an output capacitor C1 is interposed between the terminal CPVDD and a grounding line, an output capacitor C2 between the terminal CPVSS and the grounding line, and a flying capacitor C3 between the terminals CP and CN. Ideally, the output capacitor C1, the output capacitor C2, and the flying capacitor C3 have the same capacitance. In the following description, for the sake of convenience in description, a voltage appearing at the terminal CPVDD may be indicated as the voltage CPVDD, that appearing at the terminal CP as the voltage CP, that appearing at the terminal GND as the voltage GND, that appearing at the terminal CN as the voltage CN, and that appearing at the terminal CPVSS as the voltage CPVSS.

The switching circuit 20 has P-channel field effect transistors (also referred to merely as transistors) P1 to P5, and N-channel transistors N1 to N3. The P-channel transistor P1 is interposed between a power supply HPVDD and the terminal CP, the P-channel transistor P2 between the power supply HPVDD and the terminal CPVDD, the P-channel transistor P3 between the terminal CPVDD and the terminal CP, the P-channel transistor P4 between the terminal CPVDD and the terminal CN, and the P-channel transistor P5 between a power supply SPVDD and the terminal CP. For example, the voltage of the power supply HPVDD is 1.8 V. The voltage of the power supply SPVDD is higher than that of the power supply HPVDD, and, for example, 3.6 V. The N-channel transistor N1 is interposed between the terminal CP and the terminal GND, the N-channel transistor N2 between the terminal CN and the terminal GND, and the N-channel transistor N3 between the terminal CN and the terminal CPVSS.

As an operation mode, the charge pump 1 of the embodiment has a high-voltage outputting mode, a low-voltage outputting mode, a relay mode, and a high-power mode.

The high-voltage outputting mode is an operation mode where the positive voltage CPVDD (=HPVDD) and negative voltage CPVSS (=−HPVDD) which are equal in level to the power supply voltage HPVDD are output from the terminals CPVDD, CPVSS, respectively. The low-voltage outputting mode is an operation mode where the positive voltage CPVDD (=HPVDD/2) and negative voltage CPVSS (=−HPVDD/2) the levels of which are one half of the level of the power supply voltage HPVDD are output from the terminals CPVDD, CPVSS, respectively. The relay mode is an operation mode which is disposed in order that the high-voltage outputting mode smoothly transitions to the low-voltage outputting mode. In the high-voltage outputting mode, the low-voltage outputting mode, and the relay mode, only the power supply HPVDD is used, and the power supply SPVDD is not used. The high-power mode is an operation mode where the positive voltage CPVDD (=HPVDD) the level of which is equal to that of the power supply voltage HPVDD, and the negative voltage CPVSS having an arbitrary level are output from the terminals CPVDD, CPVSS, respectively. In the high-power mode, the power supply SPVDD is used in addition to the power supply HPVDD, and the negative voltage CPVDD the level of which is higher than the power supply voltage HPVDD within the range of the power supply voltage SPVDD can be generated.

The control unit 10 controls transitions between the above-described operation modes, and controls the switching circuit 20 in the operation modes. The control unit 10 switches the gate voltages that are to be applied to the gates of the P-channel transistors P1 to P5 and the N-channel transistors N1 to N3 by procedures which are synchronized with a clock CLK of a predetermined frequency, and which are determined respectively for the operation modes, thereby realizing the above-described operation modes. The control of the switching circuit 20 which is performed for realizing the high-voltage outputting mode, the low-voltage outputting mode will be described in detail. The high-power mode is not largely related to the characteristics of the invention and is not essential for the invention, and hence its detailed description is omitted.

In the embodiment, the transition between the low-voltage outputting mode and the high-voltage outputting mode is performed on the basis of the output state of the load driving section 2. The output state detecting section 3 is a circuit which generates information triggering the mode transition. More specifically, the output state detecting section 3 monitors the output state of the load driving section 2, and outputs the output state detection signal DETO indicating whether or not the level of the output signal AMPO of the load driving section 2 exceeds the predetermined limit to approach the power supply voltage (specifically, the positive voltage CPVDD and the negative voltage CPVSS) supplied to the load driving section 2.

Figure 2A:
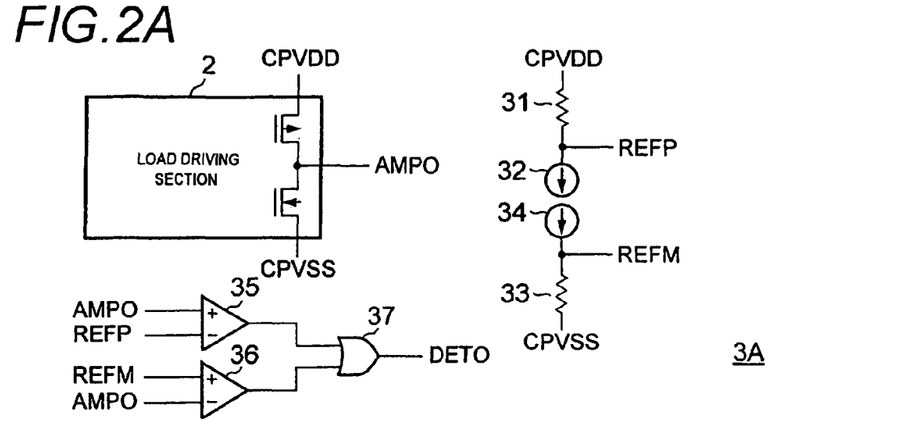
FIGS. 2A to 2C are circuit diagrams showing configuration examples of an output state detecting section 3 in the embodiment.
Figure 2B:
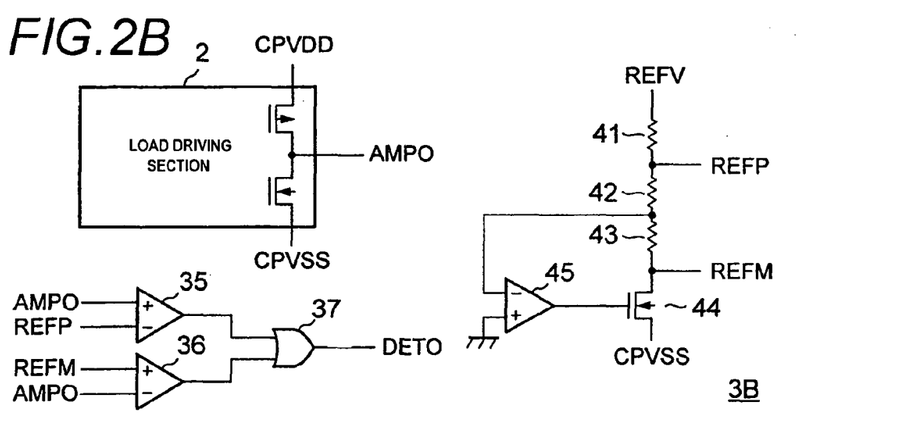
Figure 2C:
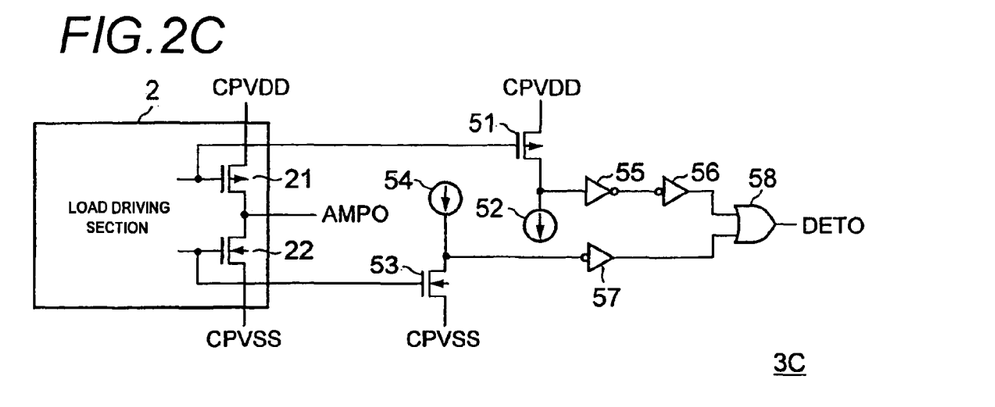

FIGS. 2A to 2C are circuit diagrams showing various configuration examples of the output state detecting section 3. In an output state detecting section 3A shown in FIG. 2A, a resistor 31 and a constant-current source 32 constitute a circuit which generates a reference level REFP from their common junction. The resistor 31 is interposed between the power supply CPVDD and the constant-current source 32, and the current of the constant-current source 32 flows through the resistor. When the current of the constant-current source 32 is indicated by I0, and the resistance of the resistor 31 is indicated by R0, therefore, the reference level REFP obtained from the common junction of the resistor 31 and the constant-current source 32 is CPVDD−I0·R0. A resistor 33 and a constant-current source 34 constitute a circuit which generates a reference level REFM from their common junction. The resistor 33 is interposed between the power supply CPVSS and the constant-current source 34, and the current of the constant-current source 34 flows through the resistor. When the current of the constant-current source 34 is indicated by I0 similarly with the constant-current source 32, and the resistance of the resistor 33 is indicated by R0 similarly with the resistor 31, therefore, the reference level REFM obtained from the common junction of the resistor 33 and the constant-current source 34 is CPVSS+I0·R0. The comparator 35 outputs a signal which, in the case where the output signal AMPO of the load driving section 2 is higher than the reference level REFP, is at the H level, and, in the other case, at the L level. The comparator 36 outputs a signal which, in the case where the output signal AMPO of the load driving section 2 is lower than the reference level REFM, is at the H level, and, in the other case, at the L level. When both the output signals of the comparators 35, 36 are at the L level, an OR gate 37 sets the output state detection signal DETO to the L level, and, when at least one of the output signals of the comparators 35, 36 is at the H level, sets the output state detection signal DETO to the H level. When the output signal AMPO of the load driving section 2 is within the range between the reference level REFP and the reference level REFM, therefore, the output state detection signal DETO is at the L level, and, when the output signal AMPO exceeds a constant limit to approach the power supply voltage CPVDD or CPVSS, or specifically, when the output signal AMPO is higher than the reference level REFP or lower than the reference level REFM, is at the H level.

In an output state detecting section 3B shown in FIG. 2B, the circuit which generates the reference levels REFP and REFM in the output state detecting section 3A shown in FIG. 2A is changed. The circuit configuration of the portion configured by the comparators 35, 36 and the OR gate 37 is identical with that shown in FIG. 2A. In the output state detecting section 3B, the circuit which generates the reference levels REFP and REFM is configured by resistors 41, 42, 43 having the same resistance, an N-channel transistor 44, and an operational amplifier 45. The resistors 41, 42, 43 are interposed in series between a voltage source which generates a constant reference level REFV, such as a band-gap reference circuit, and the drain of the N-channel transistor 44. The source of the N-channel transistor 44 is connected to a power supply CPVSS. In the operational amplifier 45, the positive input terminal (+terminal) is grounded, and the inverted input terminal (−terminal) is connected to the common junction of the resistors 42, 43. According to the configuration, the negative feedback to the operational amplifier 45 is performed through the common junction of the resistors 42, 43, and the operational amplifier 45 outputs the gate voltage to the N-channel transistor 44 so that the potential of the common junction of the resistors 42, 43 equals to the ground potential. Therefore, the reference level REFP obtained from the common junction of the resistors 41, 42 is REFV/2, and the reference level REFM obtained from the drain of the N-channel transistor 44 is −REFV/2.

An output state detecting section 3C shown in FIG. 2C is a circuit which detects currents flowing through transistors of the output stage of the load driving section 2, and which, based on a result of the detection, outputs the output state detection signal DETO. In the example shown in FIG. 2C, the load driving section 2 has a P-channel transistor 21 and N-channel transistor 22 which are interposed in series between the power supplies CPVDD, CPVSS, and outputs the output signal AMPO from the junction of the drains of the transistors. In the load driving section 2, when the drain current flown in the P-channel transistor 21 is increased by adjusting the gate voltage to be applied to the P-channel transistor 21, the output signal AMPO is increased, and, when the drain current flown in the N-channel transistor 22 is increased by adjusting the gate voltage to be applied to the N-channel transistor 22, the output signal AMPO is reduced. The output state detecting section 3C shown in FIG. 2C detects the drain currents which flow respectively through the P-channel transistor 21 and N-channel transistor 22 of the load driving section 2, and, based on a result of the detection, determines whether the output signal AMPO of the load driving section 2 exceeds a constant limit to approach the power supply voltages CPVDD and CPVSS or not. This will be described in more detail below.

First, a P-channel transistor 51 is configured so that the source is fixed at the power supply voltage CPVDD, and the gate voltage which is equal to that applied to the P-channel transistor 21 of the load driving section 2 is applied to the gate, and cooperates with the P-channel transistor 21 to constitute a current mirror. Therefore, a drain current which is k1 times (k1 is a coefficient which is defined by the size ratio of the P-channel transistor 21 to the P-channel transistor 51) the drain current of the P-channel transistor 21 flows in the P-channel transistor 51. A constant-current source 52 is connected to the drain of the P-channel transistor 51. The current value of the constant-current source 52 is k1 times the drain current of the P-channel transistor 21 which flows when the level of the output signal AMPO of the load driving section 2 is at a certain upper limit level (corresponding to the reference level REFP in FIG. 2A or 2B). When the level of the output signal AMPO of the load driving section 2 is lower than the upper limit level, therefore, the drain current of the P-channel transistor 51 is smaller than the current of the constant-current source 52, and the drain voltage of the P-channel transistor 51 is at the L level which is a voltage value that is very lower than the power supply voltage CPVDD. By contrast, when the level of the output signal AMPO of the load driving section 2 is higher than the upper limit level, the drain current of the P-channel transistor 51 is larger than the current of the constant-current source 52, and the drain voltage of the P-channel transistor 51 is at the H level which is a voltage value that is close to the power supply voltage CPVDD. The drain voltage of the P-channel transistor 51 is applied to an OR gate 58 through inverters 55, 56.

Next, an N-channel transistor 53 is configured so that the source is fixed at the power supply voltage CPVSS, and the gate voltage which is equal to that applied to the N-channel transistor 22 of the load driving section 2 is applied to the gate, and cooperates with the N-channel transistor 22 to constitute a current mirror. Therefore, a drain current which is k2 times (k2 is a coefficient which is defined by the size ratio of the N-channel transistor 22 to the N-channel transistor 53) the drain current of the N-channel transistor 22 flows in the N-channel transistor 53. A constant-current source 54 is connected to the drain of the N-channel transistor 53. The current value of the constant-current source 54 is k2 times the drain current of the N-channel transistor 22 which flows when the level of the output signal AMPO of the load driving section 2 is at a certain lower limit level (corresponding to the reference level REFM in FIG. 2A or 2B). When the level of the output signal AMPO of the load driving section 2 is higher than the lower limit level, therefore, the drain current of the N-channel transistor 53 is smaller than the current of the constant-current source 54, and the drain voltage of the N-channel transistor 53 is at the H level which is a voltage value that is very higher than the power supply voltage CPVSS. By contrast, when the level of the output signal AMPO of the load driving section 2 is lower than the lower limit level, the drain current of the N-channel transistor 53 is larger than the current of the constant-current source 54, and the drain voltage of the N-channel transistor 53 is at the L level which is a voltage value that is close to the power supply voltage CPVSS. The drain voltage of the N-channel transistor 53 is passed through an inverter 57 to be level-inverted, and then applied to the OR gate 58.

When both the output signals of the inverters 56, 57 are at the L level, the OR gate 58 sets the output state detection signal DETO to the L level, and, when at least one of the output signals of the inverters 56, 57 is at the H level, i.e., when the output signal AMPO of the load driving section 2 is higher than the upper limit level or lower than the lower limit level, sets the output state detection signal DETO to the H level.

Figure 3:
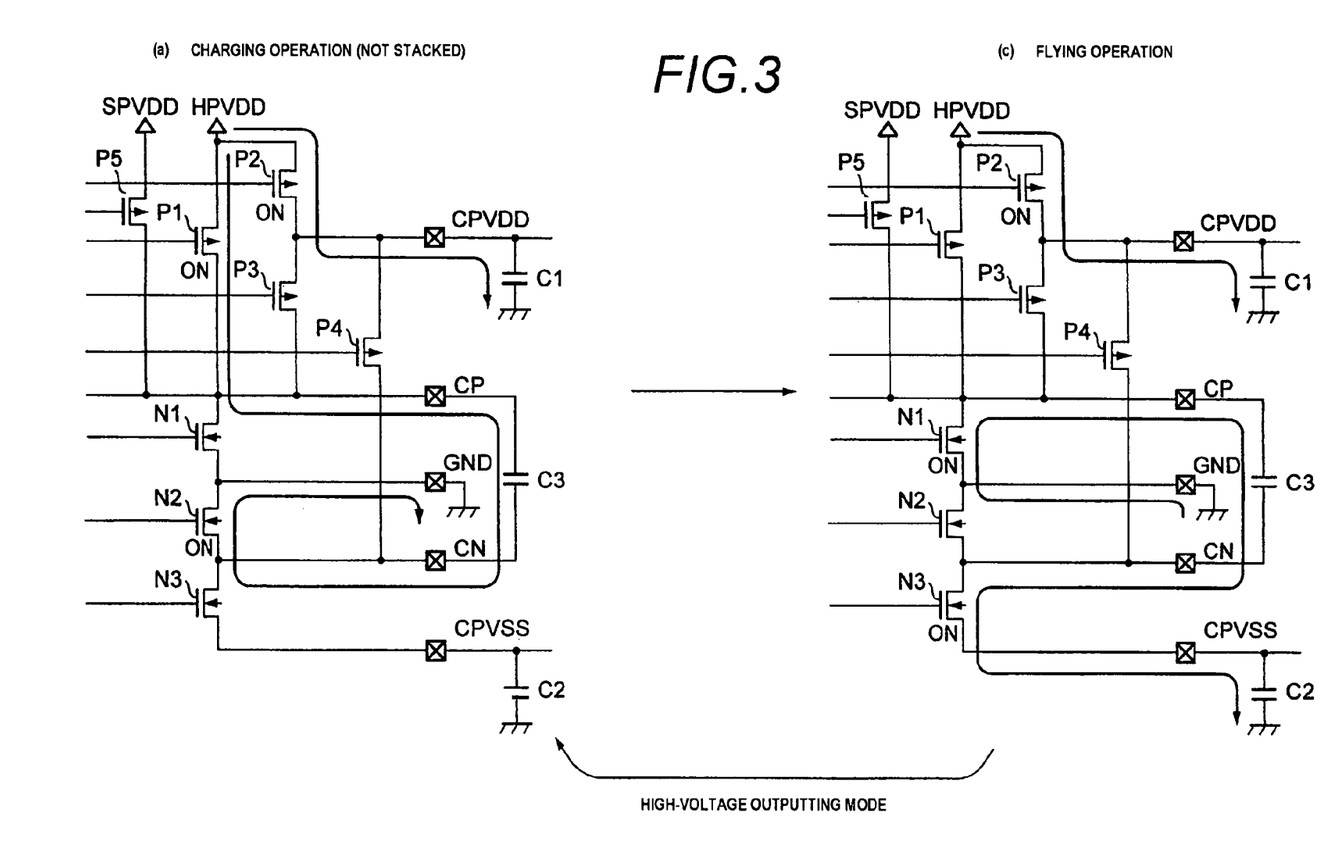
FIG. 3 shows the state transition in a high-voltage outputting mode of the charge pump in the embodiment.

Next, the operation modes of the charge pump 1 will be described in detail. FIG. 3 shows the state transition of the charge pump 1 in the high-voltage outputting mode. In the high-voltage outputting mode, as shown in FIG. 3, the charge pump 1 alternately repeats a charging operation (see (a) of FIG. 3) and a flying operation (see (c) of FIG. 3) in synchronization with the clock CLK.

In the charging operation (see (a) of FIG. 3), the control unit 10 causes the P-channel transistors P1, P2 and N-channel transistor N2 of the switching circuit 20 to turn ON, and the other transistors to turn OFF. As a result, as illustrated, the output capacitor C1 is charged through the path of the power supply HPVDD→the P-channel transistor P2→the output capacitor C1→the grounding line, and the power supply voltage HPVDD is applied to the output capacitor C1. Also, as illustrated, the flying capacitor C3 is charged through the path of the power supply HPVDD→the P-channel transistor P1→the flying capacitor C3→the N-channel transistor N2→the grounding line, and the power supply voltage HPVDD is applied to the flying capacitor C3. In this case, the flying capacitor C3 is in a state where positive charges are charged in an electrode on the side of the terminal CP, and negative charges are charged in an electrode on the side of the terminal CN.

When the charging operation (see (a) of FIG. 3) is performed for a constant period of time, the flying operation (see (c) of FIG. 3) is then performed for a constant period of time. In the flying operation (see (c) of FIG. 3), the control unit 10 causes the P-channel transistor P2 and N-channel transistors N1, N3 of the switching circuit 20 to turn ON, and the other transistors to turn OFF. As a result, as illustrated, the output capacitor C1 is charged through the path of the power supply HPVDD→the P-channel transistor P2→the output capacitor C1→the grounding line, and the power supply voltage HPVDD is applied to the output capacitor C1. Also, as illustrated, a path of the grounding line→the N-channel transistor N1→the flying capacitor C3→the N-channel transistor N3→the output capacitor C2→the grounding line is formed. In the flying capacitor C3, then, the electrode on the side of the terminal CP in which positive charges are charged is grounded through the N-channel transistor N1, and that on the side of the terminal CN in which negative charges are charged is connected to the terminal CPVSS through the N-channel transistor N3, so that the flying capacitor is connected in parallel to the output capacitor C2. In this way, the charging voltage HPVDD of the flying capacitor C3 is inverted and then applied to the output capacitor C2, and the charging voltage of the output capacitor C2 is −HPVDD.

Thereafter, the charging operation and the flying operation are repeated similarly, the power supply voltage CPVDD=HPVDD is supplied from the terminal CPVDD to the positive power supply terminal of the load driving section 2, and the power supply voltage CPVSS=−HPVDD is supplied from the terminal CPVSS to the negative power supply terminal of the load driving section 2.

Figure 4:
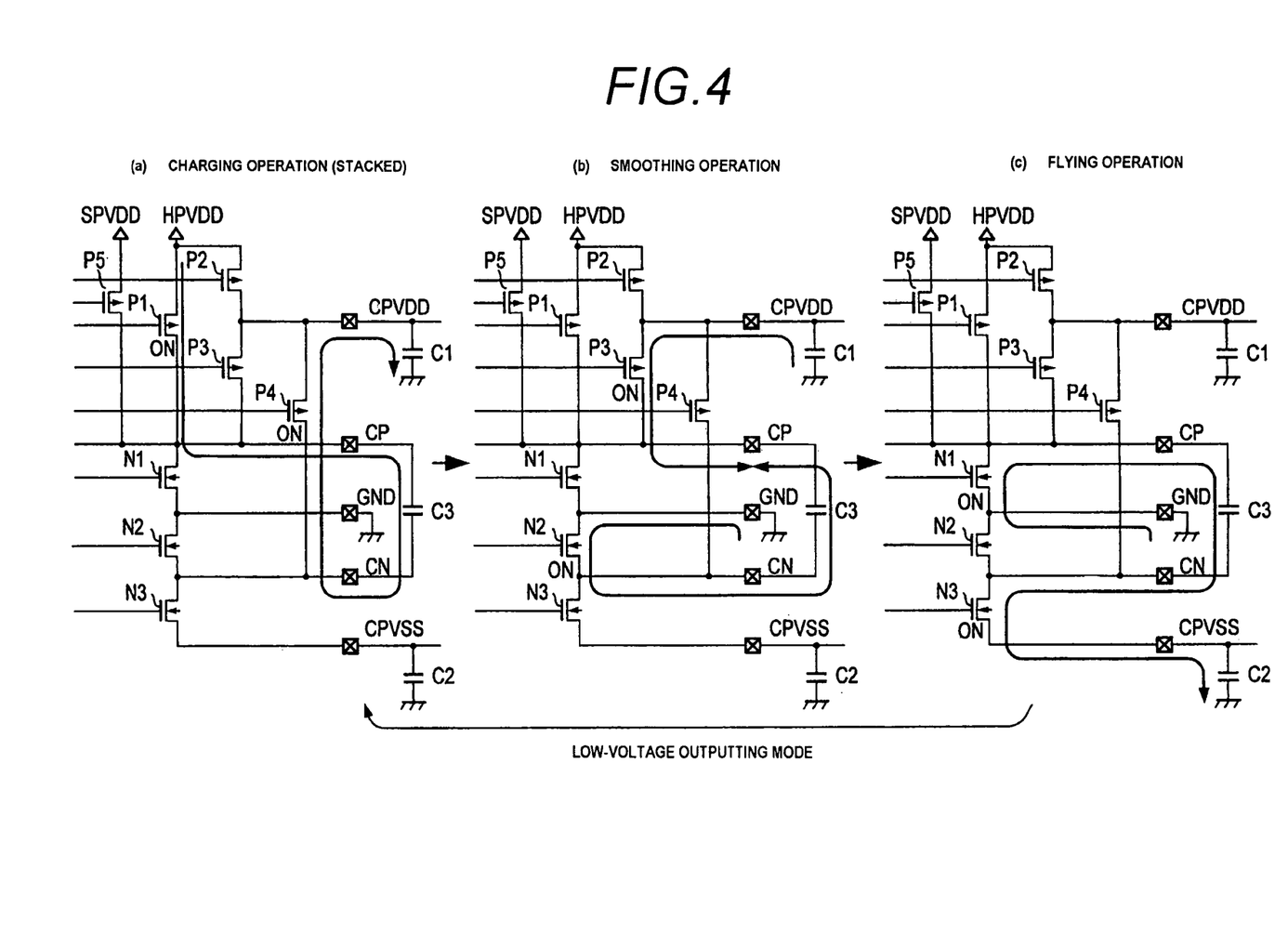
FIG. 4 shows the state transition in a low-voltage outputting mode of the charge pump in the embodiment.

FIG. 4 shows the state transition of the charge pump 1 in the low-voltage outputting mode. In the low-voltage outputting mode, as shown in FIG. 4, the charge pump 1 repeats a charging operation (see (a) of FIG. 4), a smoothing operation (see (b) of FIG. 4), and a flying operation (see (c) of FIG. 4) sequentially and cyclically in synchronization with the clock CLK.

In the charging operation (see (a) of FIG. 4), the control unit 10 causes the P-channel transistors P1, P4 of the switching circuit 20 to turn ON, and the other transistors to turn OFF. As a result, as illustrated, the path of the power supply HPVDD→the P-channel transistor P1→the flying capacitor C3→the P-channel transistor P4→the output capacitor C1→the grounding line is formed. In a state where the flying capacitor C3 and the output capacitor C1 are connected in series between the power supply HPVDD and the grounding line, then, the flying capacitor C3 and the output capacitor C1 are charged. In this case, the flying capacitor C3 and the output capacitor C1 are in a so-called stacked state between the power supply HPVDD and the grounding line, and a voltage of HPVDD/2 is applied to each of the capacitors. In this case, the flying capacitor C3 is in a state where positive charges are charged in the electrode on the side of the terminal CP, and negative charges are charged in the electrode on the side of the terminal CN.

When the charging operation (see (a) of FIG. 4) is performed for a constant period of time, the smoothing operation (see (b) of FIG. 4) is then performed for a constant period of time. In the smoothing operation (see (b) of FIG. 4), the control unit 10 causes the P-channel transistor P3 and N-channel transistor N2 of the switching circuit 20 to turn ON, and the other transistors to turn OFF. As a result, as illustrated, the path of the grounding line→the N-channel transistor N2→the flying capacitor C3→the P-channel transistor P3→the output capacitor C1→the grounding line is formed. Then, in the flying capacitor C3, the electrode on the side of the terminal CN in which negative charges are charged is grounded through the N-channel transistor N2, and that on the side of the terminal CP in which positive charges are charged is connected to the terminal CPVDD through the P-channel transistor P3, so that the flying capacitor is connected in parallel to the output capacitor C1. As a result, the charging voltage of the output capacitor C1 is equal to that of the flying capacitor C3, and the charging voltage CPVDD of the output capacitor C1 is HPVDD/2.

When the smoothing operation (see (b) of FIG. 4) is performed for a constant period of time, the flying operation (see (c) of FIG. 4) is then performed for a constant period of time. In the flying operation (see (c) of FIG. 4), the control unit 10 causes the N-channel transistors N1, N3 of the switching circuit 20 to turn ON, and the other transistors to turn OFF. As a result, as illustrated, a path of the grounding line→the N-channel transistor N1→the flying capacitor C3→the N-channel transistor N3→the output capacitor C2→the grounding line is formed. In the flying capacitor C3, then, the electrode on the side of the terminal CP in which positive charges are charged is grounded through the N-channel transistor N1, and that on the side of the terminal CN in which negative charges are charged is connected to the terminal CPVSS through the N-channel transistor N3, so that the flying capacitor is connected in parallel to the output capacitor C2. In this way, the charging voltage HPVDD/2 of the flying capacitor C3 is inverted and then applied to the output capacitor C2, and the charging voltage CPVSS of the output capacitor C2 is −HPVDD/2.

Thereafter, similarly, the charging operation, the smoothing operation, and the flying operation are repeated sequentially and cyclically, the power supply voltage CPVDD=HPVDD/2 is supplied from the terminal CPVDD to the positive power supply terminal of the load driving section 2, and the power supply voltage CPVSS=−HPVDD/2 is supplied from the terminal CPVSS to the negative power supply terminal of the load driving section 2.

Figure 5:
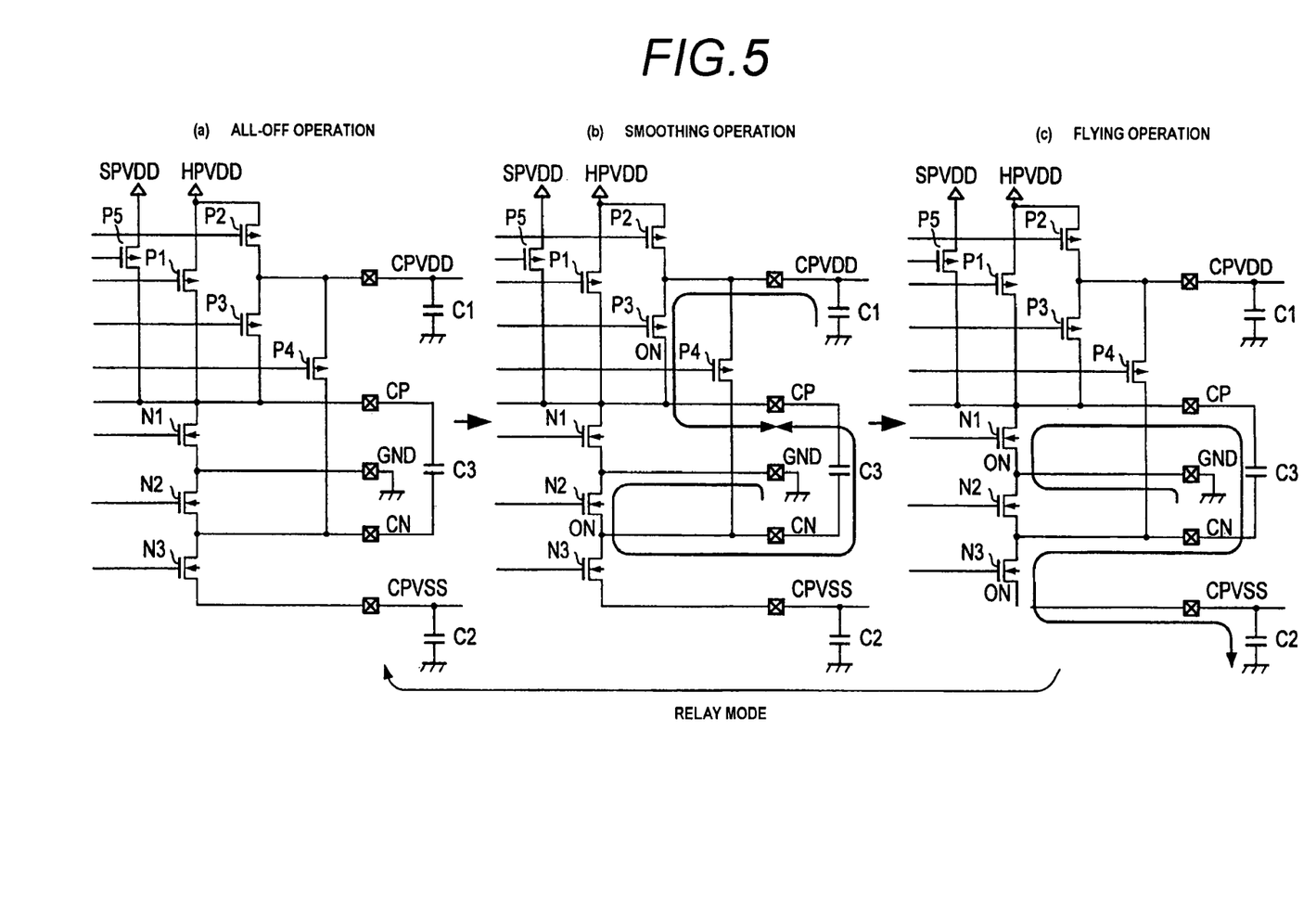
FIG. 5 shows the state transition in a relay mode of the charge pump in the embodiment.

FIG. 5 shows the state transition of the charge pump 1 in the relay mode. In the relay mode, as shown in FIG. 5, the charge pump 1 repeats an all-OFF operation (see (a) of FIG. 5), a smoothing operation (see (b) of FIG. 5), and a flying operation (see (c) of FIG. 5) sequentially and cyclically in synchronization with the clock CLK.

In the all-OFF operation (see (a) of FIG. 5), the control unit 10 causes the all transistors of the switching circuit 20 to turn OFF. During the period when the all-OFF operation is continued, the flying capacitor C3 maintains the same charging voltage. The output capacitors C1, C2 are connected to the positive and negative power supply terminals of the load driving section 2, respectively. Therefore, the charged charges of the output capacitors C1, C2 are consumed by the load driving section 2, and the charging voltages of the output capacitors C1, C2 are gradually lowered.

When the all-OFF operation (see (a) of FIG. 5) is performed for a constant period of time, the smoothing operation (see (b) of FIG. 5) is then performed for a constant period of time. In the smoothing operation (see (b) of FIG. 5), similarly with the case of the smoothing operation in low-voltage outputting mode, the control unit 10 causes the P-channel transistor P3 and the N-channel transistor N2 of the switching circuit 20 to turn ON, and the other transistors to turn OFF. As a result, the charging voltage of the output capacitor C1 is equal to that of the flying capacitor C3.

When the smoothing operation (see (b) of FIG. 5) is performed for a constant period of time, the flying operation (see (c) of FIG. 5) is then performed for a constant period of time. In the flying operation (see (c) of FIG. 5), similarly with the case of the flying operation in the low-voltage outputting mode, the control unit 10 causes the N-channel transistors N1, N3 of the switching circuit 20 to turn ON, and the other transistors to turn OFF. As a result, the flying capacitor C3 is connected in parallel to the output capacitor C2 in the state where the electrode on the side of the terminal CP is grounded, and the charging voltage of the output capacitor C2 is a negative voltage the level of which is equal to that of the flying capacitor C3.

Thereafter, similarly, the all-OFF operation, the smoothing operation, and the flying operation are repeated sequentially and cyclically. During this period, the charged charges of the output capacitors C1, C2 are consumed by the load driving section 2, and the charging voltages of the output capacitors C1, C2 and the flying capacitor C3 are gradually lowered while their levels are equalized to each other.

Figure 6:
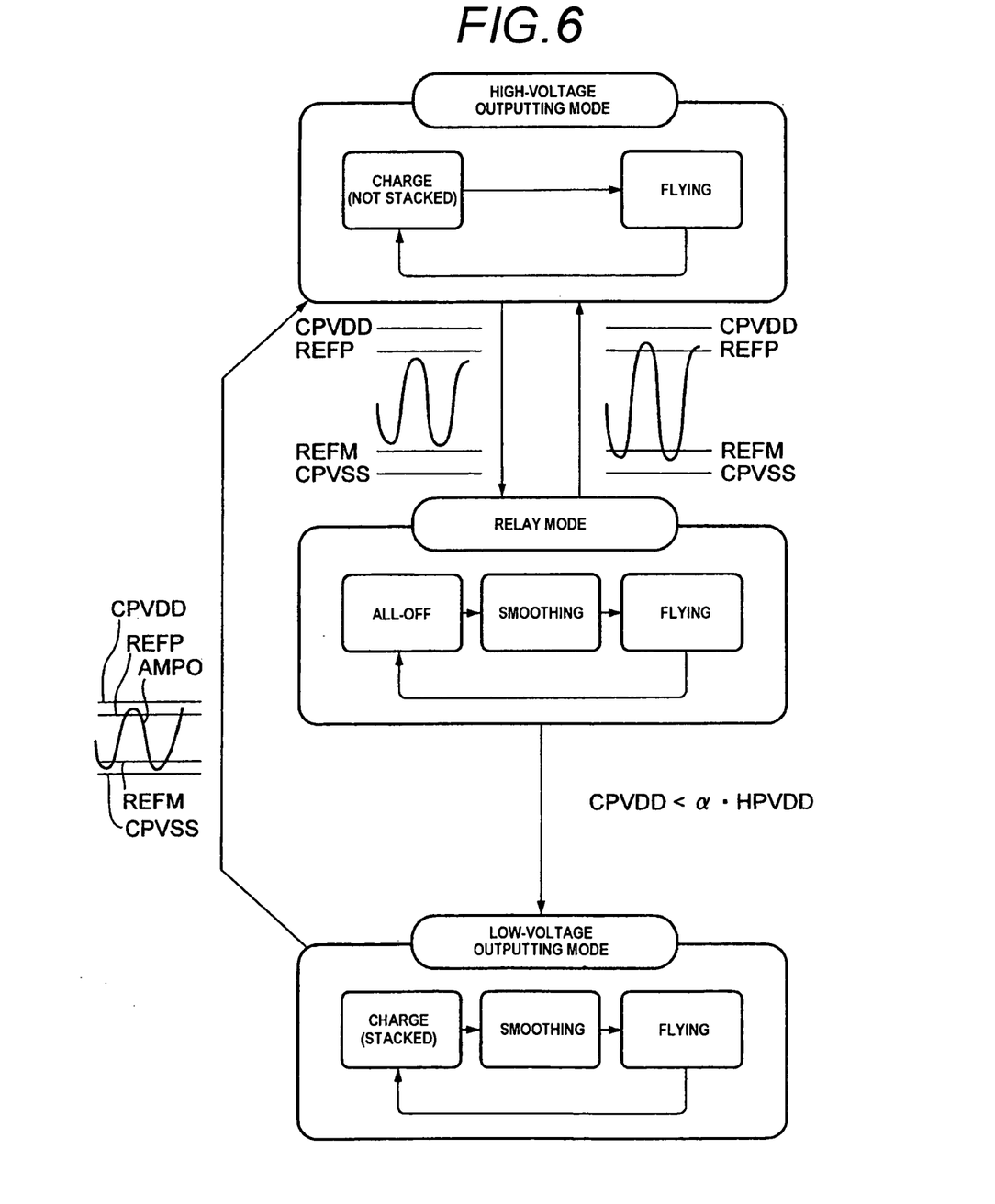
FIG. 6 shows the transitions between the modes of the charge pump 1 in the embodiment.

FIG. 6 shows the transitions between the modes of the charge pump 1 in the embodiment. In the embodiment, the change of the output state detection signal DETO output from the output state detecting section 3 from the L level to the H level is a voltage raise command to the charge pump 1. Furthermore, the change of the output state detection signal DETO from the H level to the L level is a voltage lower command to the charge pump 1. The transitions between the modes of the charge pump 1 are triggered by using a change of the output state detection signal DETO functioning as the voltage raise command or the voltage lower command. First, it is assumed that, in the case where the charge pump 1 operates in the low-voltage outputting mode, the level of the output signal AMPO of the load driving section 2 exceeds a predetermined limit to approach the power supply voltages CPVDD, CPVSS supplied to the load driving section 2, and the output state detection signal DETO is at the H level. In this case, the control unit 10 causes the operation mode of the charge pump 1 to immediately transition from the low-voltage outputting mode to the high-voltage outputting mode. In this case, the charging voltages of the output capacitors C1, C2 and the flying capacitor C3 before the mode transition are about HPVDD/2. Even when the operation mode of the charge pump 1 immediately transitions from the low-voltage outputting mode to the high-voltage outputting mode, therefore, there arises no problem.

By contrast, it is assumed that, in the case where the charge pump 1 operates in the high-voltage outputting mode, the amplitude of the output signal AMPO of the load driving section 2 is reduced, the level of the output signal AMPO exceeds a predetermined limit to approach the power supply voltages CPVDD, CPVSS supplied to the load driving section 2, and the output state detection signal DETO is at the L level. In this case, during the operation in the high-voltage outputting mode, the charging voltages of the output capacitors C1, C2 and the flying capacitor C3 are at a level which is near HPVDD. If, in response to the change of the output state detection signal DETO to the L level, the charge pump 1 is immediately transitioned from the high-voltage outputting mode to the low-voltage outputting mode, therefore, the flying capacitor C3 and the output capacitor C1 are in a stacked state between the power supply HPVDD and the grounding line (see (a) of FIG. 4) in the charging operation in the low-voltage outputting mode. The charging voltage of the whole of the flying capacitor C3 and output capacitor C1 which are stacked is a voltage in the vicinity of 2HPVDD, and hence an abnormality may occur in the operation of the charge pump 1.

In the embodiment, in the case where the output state detection signal DETO is at the L level, therefore, the control unit 10 causes the operation mode of the charge pump 1 to transition from the high-voltage outputting mode to the relay mode, and monitors, for example, the charging voltage CPVDD of the output capacitor C1. In the relay mode, while causing the charged charges of the output capacitors C1, C2 to be consumed by the load driving section 2, the all-OFF operation, the smoothing operation, and the flying operation are repeated (see (a) to (c) of FIG. 5), and hence the charging voltages of the output capacitors C1, C2 and the flying capacitor C3 are gradually lowered while their levels are equalized to each other. When, in the state where the output state detection signal DETO is at the L level, the charging voltage CPVDD of the output capacitor C1 becomes a sufficiently low level, or specifically a level which is equal to or lower than $\alpha \cdot HPVDD$, the control unit 10 causes the operation mode of the charge pump 1 to transition to the low-voltage outputting mode.

In the embodiment, $\alpha$ is 0.55. The reason why $\alpha$ is 0.55 is as follows. First, the power amplifying circuit shown in FIG. 1 is formed on a P-type semiconductor substrate doped with a low concentration P-type impurity, and the P-channel transistors of the power amplifying circuit are formed in N-wells which are isolated regions formed by doping of a low concentration N-type impurity into the P-type semiconductor substrate. During the operations in the high-voltage outputting mode, the low-voltage outputting mode, and the relay mode, the power supply voltage HPVDD is applied to N-wells to which the P-channel transistors P1, P2, P3, and P4 shown in FIG. 1 belong respectively. In the case where the high-voltage outputting mode transitions to the low-voltage outputting mode through the relay mode, the state where the flying capacitor C3 and output capacitor C1 which are stacked between the power supply HPVDD and the grounding line is obtained in the low-voltage outputting mode after the transition. When the voltage across the flying capacitor C3 and output capacitor C1 which are stacked is higher than the power supply voltage HPVDD by a predetermined voltage or higher, a current flows through a parasitic diode interposed between the drain of the P-channel transistor P1 and the N-well to which the P-channel transistor P1 belongs, and there is a possibility that an abnormality may occur in the operation of the charge pump 1. By contrast, in the embodiment, when the charging voltages of the output capacitors C1, C2 and the flying capacitor C3 are $\alpha \cdot HPVDD = 0.55 \cdot HPVDD$ or lower, the transition from the relay mode to the low-voltage outputting mode is performed. In the charging operation in the low-voltage outputting mode, therefore, the voltage across the flying capacitor C3 and output capacitor C1 which are stacked is $1.1 \cdot HPVDD$. In the case where $HPVDD=1.8$ V, an excess over the power supply voltage HPVDD is about $0.1 \cdot HPVDD = 0.18$V. Even when an excess voltage of this level occurs, there is no possibility that the above-described parasitic diode is turned ON, and hence an abnormality does not occur in the operation of the charge pump 1. This is the reason why $\alpha$ is 0.55.

In the embodiment, the transition from the high-voltage outputting mode to the low-voltage outputting mode which is performed while being passed through the relay mode has a further advantage, or an advantage that stable mode transition is realized. In the case where the amplitude of the output signal AMPO of the load driving section 2 is slowly increased, for example, when the transition from the high-voltage outputting mode to the low-voltage outputting mode is not passed through the relay mode, the following disadvantage occurs. The output signal AMPO exceeds a constant limit to approach the power supply voltage supplied to the load driving section 2, and the output state detection signal DETO is at the H level, whereby the charge pump 1 is transitioned from the low-voltage outputting mode to the high-voltage outputting mode. In the case where the output state detecting section 3A shown in FIG. 2A is used as the output state detecting section 3, for example, the rising of the reference level REFP and the lowering of the reference level REFM occur in accordance with the transition from the low-voltage outputting mode to the high-voltage outputting mode. When the amplitude of the output signal AMPO is slowly increased, the output state detection signal DETO which is once set to the H level is immediately returned to the L level. When the transition from the high-voltage outputting mode to the low-voltage outputting mode is not passed through the relay mode, therefore, the operation mode immediately transitions to the low-voltage outputting mode in response to the change of the output state detection signal DETO to the L level. When returned to the low-voltage outputting mode, however, the lowering of the reference level REFP and the rising of the reference level REFM occur in conjunction with the return, and hence the output state detection signal DETO is again at the H level, so that the low-voltage outputting mode transitions to the high-voltage outputting mode. In the case where the amplitude of the output signal AMPO of the load driving section 2 is slowly increased as described above, there is the possibility that the mode transition between the low-voltage outputting mode and the high-voltage outputting mode frequently occur.

In the embodiment, in the case where, for example, the amplitude of the output signal AMPO of the load driving section 2 is slowly increased and the transition from the low-voltage outputting mode to the high-voltage outputting mode is performed, when the output state detection signal DETO is then changed from the H level to the L level, however, the mode transitions from the high-voltage outputting mode to the relay mode is performed. When, during the operation of the relay mode, the output state detection signal DETO is again changed to the H level, the operation mode is returned from the relay mode to the high-voltage outputting mode. In the embodiment, as described above, in the case where the amplitude of the output signal AMPO of the load driving section 2 is slowly increased, it is possible to prevent the mode transition between the low-voltage outputting mode and the high-voltage outputting mode from frequently occurring, and the operation of the charge pump 1, and that of load driving section 2 which is powered from the charge pump 1 can be stabilized.

As described above, the power amplifying circuit in the embodiment is configured so that the circuit monitors the output state of the load driving section, and, when it is detected that the level of the output signal of the load driving section exceeds the predetermined limit to approach the power supply voltage supplied to the load driving section, the power supply voltage supplied to the load driving section is switched to a higher power supply voltage. As compared with a configuration where, for example, the power supply voltage is switched over on the basis of the input signal, therefore, the circuit can be easily designed, and the power supply voltage can be stably switched over at an appropriate timing.

According to the embodiment, moreover, the charge pump having the high-voltage outputting mode, the low-voltage outputting mode, and the relay mode is employed as the power supply circuit, and the control unit of the charge pump is configured so that, when, during the operation in the low-voltage outputting mode, it is detected that the level of the output signal of the load driving section exceeds the predetermined limit to approach the power supply voltage, the operation mode of the charge pump is caused to immediately transition from the low-voltage outputting mode to the high-voltage outputting mode, and, when it is detected that the level of the output signal of the load driving section does not approach the power supply voltage exceeding the predetermined limit, the operation mode of the charge pump is caused to transition from the high-voltage outputting mode to the relay mode, and then caused to transition to the low-voltage outputting mode. Therefore, charges which are charged into the first and second output capacitors and the flying capacitor during the operation in the high-voltage outputting mode can be reduced by passing through the relay mode. After the transition to the low-voltage outputting mode, the voltage across the flying capacitor and first output capacitor which are connected in series can be prevented from being abnormally raised during the charging operation, and smooth mode transition can be realized.

According to the embodiment, when it is detected that the level of the output signal of the load driving section does not approach the power supply voltage exceeding the predetermined limit, the operation mode is caused to transition from the high-voltage outputting mode to the relay mode, and then caused to transition to the low-voltage outputting mode. Accordingly, in the case where the rising speed of the level of the output signal of the load driving section is slow, for example, an abnormality that the mode transition between the low-voltage outputting mode and the high-voltage outputting mode is frequently caused can be prevented from occurring, and the operations of the charge pump and the load driving section can be stabilized.

In the embodiment, the smoothing operation is repeated in the relay mode. In the case where it is detected that the level of the output signal of the load driving section does not approach the power supply voltage exceeding the predetermined limit, and the operation mode is caused to transition from the high-voltage outputting mode to the relay mode, therefore, the charging voltages of the first and second output capacitors and the flying capacitor are gradually lowered while their levels are equalized to each other, in the relay mode. In order to obtain the timing of the transition from the relay mode to the low-voltage outputting mode, therefore, it is requested to monitor only the charging voltage of one of the first output capacitor, the second output capacitor, and the flying capacitor, and there is an advantage that only one circuit for monitoring the charging voltage of a capacitor is necessary.

<Modifications>

Although the embodiment of the invention has been described, the invention may be implemented in various modifications as described below.

(1) In the relay mode, the all-OFF operation may be omitted, and the smoothing operation and the flying operation may be alternately repeated.

(2) In the embodiment, in the relay mode, the charging voltage CPVDD of the first output capacitor C1 is set as a monitor object, and, when the voltage CPVDD is equal to or lower than α·HPVDD, the transition to the low-voltage outputting mode is performed. Alternatively, the charging voltage of the second output capacitor C2 or the flying capacitor C3 may be set as a monitor object.

(3) In the embodiment, when the relay mode is continued for predetermined time period or longer while the output state detection signal DETO is maintained at the L level, the transition from the relay mode to the low-voltage outputting mode may be performed. Even in such a simple method, it is possible to attain the same effects as those of the embodiment, in the case where relationships between the elapsed time after the transition to the relay mode and the charging voltages of the first output capacitor C1, the second output capacitor C2, and the flying capacitor C3 are stabilized.

(4) In the embodiment, the charge pump 1 functioning as a power supply circuit generates the positive power supply voltage CPVDD and the negative power supply voltage CPVSS while the voltages are centered about the ground level (the level of the terminal GND). Alternatively, the charge pump may be configured so as to generate the positive power supply voltage CPVDD and the negative power supply voltage CPVSS while the voltages are centered about another reference level which is not the ground level.

(5) In the embodiment, the charge pump 1 functioning as a power supply circuit generates the positive power supply voltage CPVDD and the negative power supply voltage CPVSS while using the positive input power supplies HPVDD, SPVDD. Alternatively, the charge pump may be configured so as to generate the positive power supply voltage CPVDD and the negative power supply voltage CPVSS while using a negative input power supply.

(6) In the embodiment, field effect transistors are used as switching elements constituting the switching circuit 20. Alternatively, switching elements of another kind such as bipolar transistors may be used.

(7) In the embodiment, the charge pump 1 is used as a power supply circuit of the power amplifying circuit. Alternatively, the charge pump of the invention may be applied also to uses other than a power amplifying circuit.

(8) In the embodiment, the value α is 0.55 to determine the threshold to change the operation mode of the charge pump 1 by transition from the relay mode to the low-voltage outputting mode. However, the value α (=0.55) is one example, and the transition timing to the low-voltage outputting mode can be changed by setting the value α at an arbitrary value lower than 0.55. Further, the value α is determined in consideration with the parasitic diodes of the transistors in the switching circuit 20. Therefore, the threshold can be set at an arbitrary value that is equal to or lower than a half value of sum of the output voltage of the input power supply HPVDD and on voltage of the parasitic diodes as far as the parasitic diodes are not turned ON to cause the abnormality in the operation of the charge pump 1.

What is claimed is:

1. A charge pump comprising:
a switching circuit which is interposed among first and second output capacitors, a flying capacitor, and an input power supply; and
a control unit which controls the switching circuit, wherein the charge pump is operated in an operation mode including a high-voltage outputting mode, a low-voltage outputting mode, and a relay mode, and
the control unit controls the switching circuit so that:
in the high-voltage outputting mode, the first and second output capacitors respectively outputs first positive and negative voltages;
in the low-voltage outputting mode, the first and second output capacitors respectively outputs second positive and negative voltages lower than the first positive and negative voltages; and
in the relay mode, respective charging voltages of the first and second capacitors that are charged in the high-voltage outputting mode are gradually lowered, and the control unit changes the operation mode of the charge pump by direct transition from the low-voltage outputting mode to the high-voltage outputting mode when a voltage raise command is given during a period when the operation mode of the charge pump is in the low-voltage outputting mode, and
the control unit changes the operation mode of the charge pump by relay transition from the high-voltage outputting mode through the relay mode to the low-voltage outputting mode when a voltage lower command is given during a period when the operation mode of the charge pump is in the high-voltage outputting mode.

2. The charge pump according to claim 1, wherein the control unit causes, in the relay mode, the switching circuit to repeatedly perform: a smoothing operation in which the input power supply is disconnected from the first and second output capacitors and the flying capacitor, and the flying capacitor and the first output capacitor are connected in parallel; and a flying operation in which the flying capacitor is disconnected from the first output capacitor, and connected in parallel to the second output capacitor.

3. The charge pump according to claim 1, wherein the control unit causes, in the high-voltage outputting mode, the switching circuit to repeatedly perform: a first charging operation in which an output voltage of the input power supply is applied to the flying capacitor and the first output capacitor; and a flying operation in which the flying capacitor is disconnected from the first output capacitor, and connected in parallel to the second output capacitor, thereby causing the first and second output capacitors to output the first positive and negative voltages, respectively, and
the control unit causes, in the low-voltage outputting mode, the switching circuit to repeatedly perform: a second charging operation in which the flying capacitor and the first output capacitor are connected in series, and the output voltage of the input power supply is applied to the flying capacitor and the first output capacitor that are connected in series; a smoothing operation in which the flying capacitor and the first output capacitor are connected in parallel; and a flying operation in which the flying capacitor is disconnected from the first output capacitor, and connected in parallel to the second output capacitor, thereby causing the first and second output capacitors to output the second positive and negative voltages.

4. The charge pump according to claim 1, wherein, when the voltage lower command is given during the period when the operation mode is in the high-voltage outputting mode, the control unit causes the operation mode to transition from the high-voltage outputting mode to the relay mode, and when a charging voltage of at least one of the first output capacitor, the second output capacitor, and the flying capacitor is lowered to a threshold or lower, causes the operation mode of the charge pump to transition from the relay mode to the low-voltage outputting mode.

5. The charge pump according to claim 1, wherein charging voltages of the first and second output capacitors and the flying capacitor are gradually lowered while their levels are equalized to each other in the relay mode.

6. The charge pump according to claim 4, wherein the threshold is an arbitrary value that is equal to or lower than a half value of sum of an output voltage of the input power supply and on voltage of a parasitic diode of transistors in the switching circuit.

7. The charge pump according to claim 4, wherein the threshold is expressed by 0.55·HPVDD where HPVDD indicates the output voltage of the input power supply.

* * * * *